United States Patent
Kwon et al.

(10) Patent No.: US 10,553,842 B2
(45) Date of Patent: Feb. 4, 2020

(54) TRAY TO ACCOMMODATE BATTERIES HAVING VARIOUS SIZES

(71) Applicant: LG Chem, Ltd., Seoul (KR)

(72) Inventors: Young Im Kwon, Daejeon (KR); Jae Han Jung, Daejeon (KR); Chan Ki Park, Daejeon (KR); Jeong Woo Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/695,607

(22) Filed: Sep. 5, 2017

(65) Prior Publication Data

US 2018/0069209 A1 Mar. 8, 2018

(30) Foreign Application Priority Data

Sep. 5, 2016 (KR) .................. 10-2016-0113889

(51) Int. Cl.
*H01M 2/10* (2006.01)
(52) U.S. Cl.
CPC ....... *H01M 2/1027* (2013.01); *H01M 2/1077* (2013.01)

(58) Field of Classification Search
CPC .................. H01M 2/1027; H01M 2/1077
See application file for complete search history.

(56) References Cited

U.S. PATENT DOCUMENTS

| 2003/0003350 A1* | 1/2003 | Heimer | H01M 2/1077 429/99 |
| 2012/0326665 A1* | 12/2012 | Yin | B60L 11/1801 320/109 |

FOREIGN PATENT DOCUMENTS

| KR | 20-0121488 Y1 | 8/1998 |
| KR | 10-1516312 B1 | 4/2015 |

* cited by examiner

*Primary Examiner* — Ladan Mohaddes
(74) *Attorney, Agent, or Firm* — Mintz Levin Cohn Ferris Glovsky and Popeo, P.C.; Steven M. Jensen

(57) ABSTRACT

Provided is a tray capable of receiving batteries having various sizes. The tray includes a housing provided with a receiving portion for receiving a secondary battery. It also includes a blocking portion coupled to the housing to cross the receiving portion for adjusting the size of the receiving portion.

12 Claims, 8 Drawing Sheets

TRAY TO ACCOMMODATE BATTERIES HAVING VARIOUS SIZES

CROSS-REFERENCE TO RELATED APPLICATIONS

This application claims the priority to Korean Patent Application No. 10-2016-0113889, filed on Sep. 5, 2016, the disclosure of which is incorporated herein by reference.

TECHNICAL FIELD

The present invention relates to a tray, and more particularly, to a tray capable of receiving batteries having various sizes.

RELATED ART

In general, a battery (or cell) that generates electric energy through physical reaction or chemical reaction and supplies power to the outside is used when an alternating current (AC) power supplied cannot be acquired or when a direct current (DC) power is needed, for example.

A primary battery and a secondary battery, which are chemical batteries using chemical reaction, are commonly used. The primary battery is a consumable battery collectively referred to as a dry cell. The secondary battery is a rechargeable battery produced by using a material that enables repetition of oxidation-reduction between an electric current and the material. In the secondary battery, when a reduction reaction is performed on the material by the electric current, the power is charged, and when an oxidation reaction is performed on the material, the power is discharged. Electricity is generated while such charging-discharging is repeatedly performed.

A lithium secondary battery may be classified into a lithium metal battery, a lithium ion battery, and a lithium pouch type battery according to types of an electrolyte.

FIG. 8 is a front view illustrating a related art transfer tray (see, e.g., Korean Patent No. 10-1516312). As illustrated in FIG. 8, a transfer tray having receiving portions 11 capable of receiving a plurality of secondary batteries 1 is used to transfer the secondary batteries. However, since the receiving portions for receiving secondary batteries are formed to have the same size, only the secondary batteries of the same size can be received in one tray. As a result, different trays should be prepared according to the dimensions of secondary batteries. Therefore, it is inconvenient to work and difficult to prepare and store various kinds of trays, thereby leading to an increase in additional costs.

SUMMARY

An aspect of the present invention provides a tray capable of receiving secondary batteries of various sizes.

A tray according to an embodiment of the present invention includes a housing provided with a receiving portion for receiving a secondary battery, and a blocking portion coupled to the housing to cross the receiving portion, and adjusting the size of the receiving portion.

The housing includes a fitting groove concavely formed in the housing to cross the receiving portion, and the blocking portion may be fitted into the fitting groove.

The fitting grooves may be provided in plurality in the receiving portion.

The fitting groove may be formed to cross the receiving portion in a direction perpendicular to the width direction of the receiving portion.

The blocking portion may include a fitting groove concavely formed to be fitted into the housing so as to cross the receiving portion.

The receiving portion may be arranged in plurality in the housing, and the blocking portion may be coupled to the housing such that a plurality of the receiving portions cross at a time in a direction crossing the receiving portion.

The blocking portion may be detachably coupled to the housing.

The blocking portions may be provided in plurality and detachably coupled to the housing.

A tray to accommodate batteries having various sizes according to an embodiment of the present invention may include a housing, a receiving portion formed within the housing as a linear recess for receiving a secondary battery therein, and a blocking portion detachably coupled to the housing to cross the receiving portion for adjusting a size of the receiving portion. The blocking portion may divide the receiving portion into a plurality of divided sections and adjust widths of the divided sections.

According to the present invention, a plurality of secondary batteries having different sizes may be received in one tray.

According to the present invention, only one tray may receive a plurality of secondary batteries having different sizes, so that costs for preparation of additional trays for receiving secondary batteries having different sizes may be reduced, thereby providing cost-saving effect.

According to the present invention, the size of a receiving portion may be adjusted to correspond to the size of a secondary battery by detachably coupling a blocking portion to a housing, so that the operation may be simple and convenient.

According to the present invention, since the size of the receiving portion may be adjusted to correspond to the size of a secondary battery in such a manner that the blocking portion is detachably coupled to the housing, secondary batteries having a relatively large size difference therebetween may also be received in one tray.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION

Figure 1:
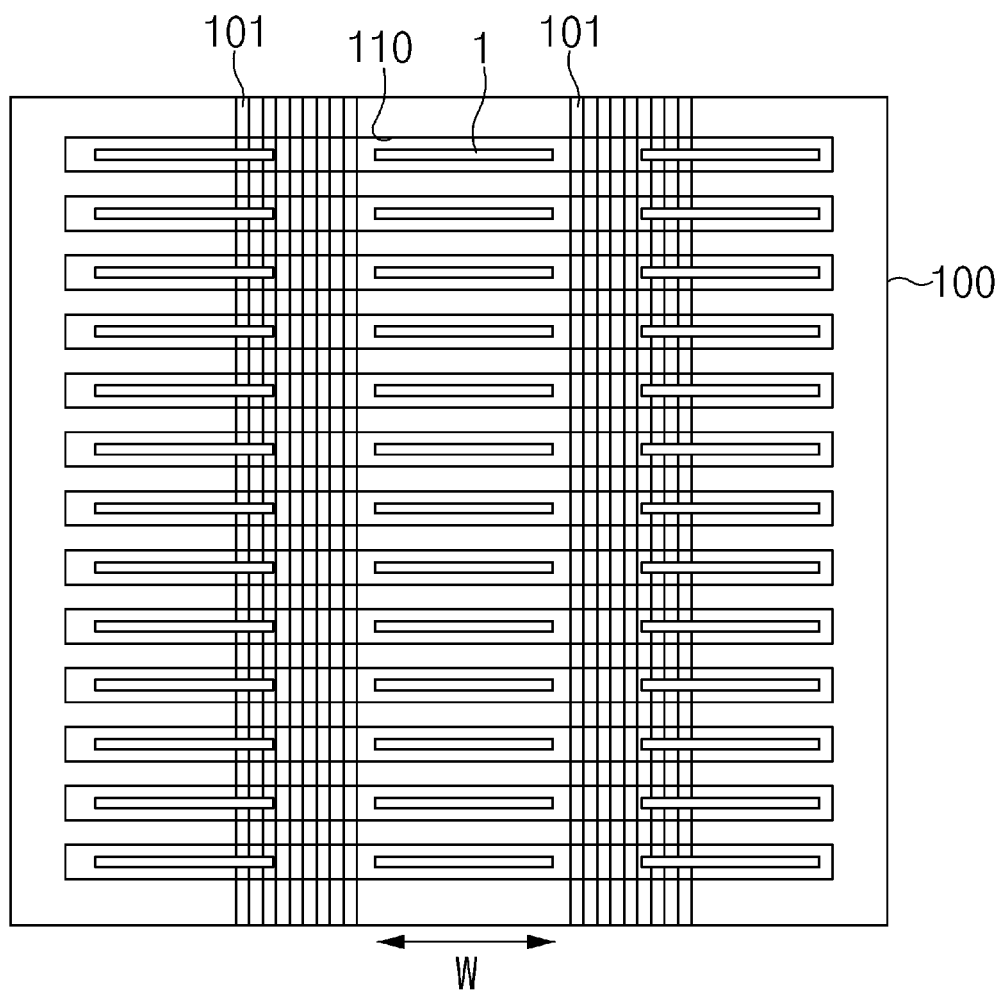
FIG. 1 is a schematic front view of a tray according to an embodiment of the present invention, with a blocking portion thereof removed therefrom.

Hereinafter, a tray according to exemplary embodiments of the present invention will be described in detail with reference to the accompanying drawings.

It will be understood that terms or words used in the present specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention. Therefore, examples set forth in this specification and the configuration illustrated in the drawings are only a most preferred embodiment, not represent all the technical ideas of the present invention. Therefore, at the filing of the present application, it will be understood that there are various equivalents that may be substituted for them.

In the drawing, the size of each element or a specific portion forming the element is exaggerated, omitted, or schematically illustrated for the convenience and clarity of description. Therefore, the size of each element does not entirely reflect the actual size. In the case where it is determined that the detailed description for the related known functions or configurations may unnecessarily obscure the gist of the present invention, such description will not be provided herein.

Figure 2:
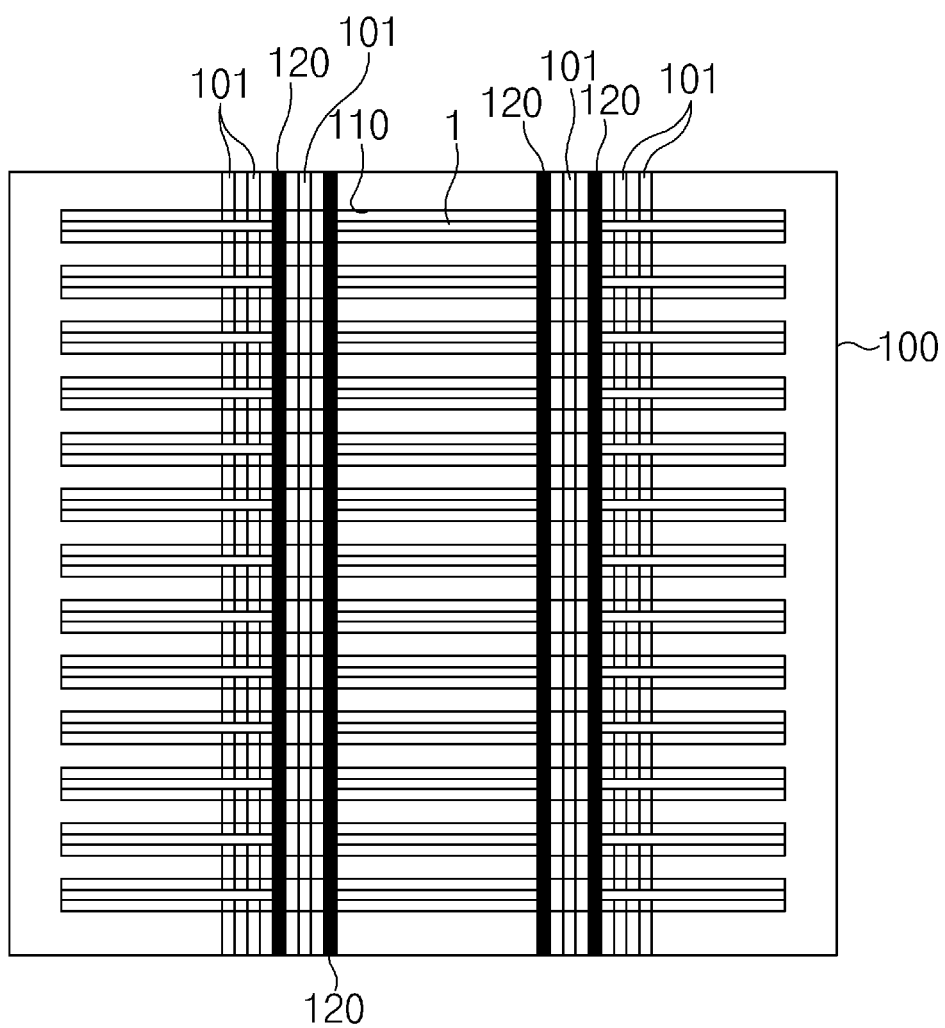
FIG. 2 is a schematic front view of the tray of FIG. 1, with the blocking portion installed thereon.

FIG. 1 is a schematic front view of a tray according to an embodiment of the present invention, with a blocking portion thereof removed therefrom, and FIG. 2 is a schematic front view of the tray of FIG. 1, with the blocking portion installed thereon.

As illustrated in FIG. 1 and FIG. 2, a tray according to an embodiment of the present invention includes a housing 100 that is provided with a receiving portion 110 for receiving a secondary battery 1, and a blocking portion 120 that is coupled to the housing 100 to cross the receiving portion 110 for adjusting the size of the receiving portion 110.

The receiving portion 110 may be arranged in plurality in the housing 100, and have one open side through which the secondary battery 1 is received.

The secondary battery 1 is formed such that an electrode assembly and an electrolytic solution are received in an outer case, and an electrode lead connected to an electrode tap of the electrode assembly extends to be exposed from the electrode tap to the outside of the outer case.

The electrode assembly, for example, may be produced by laminating, multiple times, a positive electrode coated with a positive electrode active material, a negative electrode coated with a negative electrode active material, and a separator interposed between the positive electrode and the negative electrode.

However, the present invention is not limited to the description above, and the electrode assembly may be produced by other methods (e.g., winding, in the form of a jelly roll, a laminate in which the positive electrode, the separator, and the negative electrode are laminated).

The positive electrode may be an aluminum plate and may include a positive electrode active material portion coated with the positive electrode active material and a positive electrode uncoated portion uncoated with the positive electrode active material.

The positive electrode active materials may be lithium-containing transition metal oxides such as $LiCoO_2$, $LiNiO_2$, $LiMnO_2$, and $LiMnO_4$, or lithium chalcogenide compounds.

The positive electrode active material portion is formed, for example, by coating the positive electrode active material on a portion of at least one surface of the aluminum plate, and the remaining portion of the aluminum plate uncoated with the positive electrode active material may serve as the positive electrode uncoated portion.

The negative electrode may be a copper plate and may include a negative electrode active material portion coated with the negative electrode active material and a negative electrode uncoated portion uncoated with the negative electrode active material.

The negative electrode active material may be carbon materials (e.g., crystalline carbon, amorphous carbon, carbon composite, and carbon fiber), lithium metal, lithium alloy, and the like.

The negative electrode active material portion is formed, for example, by coating the negative electrode active material on a portion of at least one surface of the copper plate, and the remaining portion of the copper plate uncoated with the negative electrode active material may serve as the negative electrode uncoated portion.

The separator may be produced, for example, by coating a polyvinylidene fluoride-hexafluoropropylene (PVDF-HFP) copolymer on any one base material selected from the group consisting of polyethylene (PE), polystyrene (PS), polypropylene (PP), and a copolymer of polyethylene (PE) and polypropylene (PP).

The electrolytic solution facilitates the migration of lithium ions in the electrode assembly and may include, for example, a non-aqueous organic solvent and a lithium salt.

The lithium salt may be dissolved in the organic solvent and may act as a supply resource of lithium ions in the secondary battery to facilitate the migration of lithium ions between the positive electrode and the negative electrode.

Examples of the lithium salt may include, as a supporting electrolyte salt, $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x}+1SO_2)(C_yF_{2y}+1SO_2)$ (where x and y are natural numbers), LiCl, LiI, lithium bisoxalate borate, etc., and any combination thereof.

The concentration of the lithium salt in an electrolytic solution may vary according to the use. It may, suitably, be in the range of 0.1 M to 2.0 M.

In addition, the organic solvent acts as a medium through which ions involved in the electrochemical reaction of the battery may migrate. Examples of the organic solvent may include, but not limited to, at least one or at least two among benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (where R is straight, branched, or cyclic hydrocarbon group having 2 to 50 carbon atoms, and the hydrocarbon group may include a double bond, an aromatic ring, an ester bond, etc.), dimethylformamide, dimethyl acetate, xylene, cyclohexane, tetrahydrofuran, 2-methyltetrahydrofuran, cyclohexanone, ethanol, isopropyl alcohol, dimethyl carbonate, ethyl methyl carbonate, diethyl carbonate, methyl propyl carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, gamma-butyrolactone, sulfolane, valerolactone, decanolide or mevalolactone.

Figure 3:
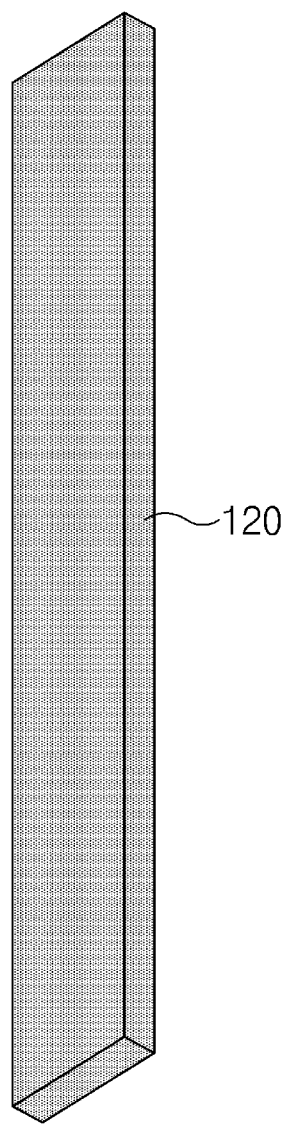
FIG. 3 is a perspective view illustrating the blocking portion of the tray, according to an embodiment of the present invention.

FIG. 3 is a perspective view illustrating the blocking portion of the tray, according to an embodiment of the present invention.

As illustrated in FIG. 3, according to an embodiment of the present invention, the blocking portion 120 may have the shape of a bar or the like and may be coupled to the housing 100 in a direction crossing a plurality of receiving portions 110 so as to cross the receiving portions 110 at a time.

A plurality of blocking portions 120 may be coupled to the housing 100, and a plurality of blocking portions may be coupled to one receiving portion 110 so that the size of a secondary battery 1 received in the receiving portion 110 may be adjusted according to the position of the blocking portion 120 coupled thereto.

In addition, the blocking portion 120 may be detachably coupled to the housing 100.

The housing 100 may include a concave fitting groove 101 for detachably coupling the blocking portion 120 to the housing 100.

The fitting groove 101 may be concavely formed in the housing 100 to cross the receiving portion 110 to allow the blocking portion 120 to be detachably fitted into the fitting groove 101.

In other words, the fitting groove 101 is formed to cross the receiving portion in a direction perpendicular to the width direction W of the receiving portion 110, so that the blocking portion 120 coupled to the fitting portion 101 may cross the receiving portion 100.

However, the tray of the present invention may have a plurality of the secondary batteries 1 for activating the secondary batteries 1.

When the secondary batteries 1 change into a charged state from a discharged state, the secondary batteries are received in the tray and activated through aging.

Figure 4:
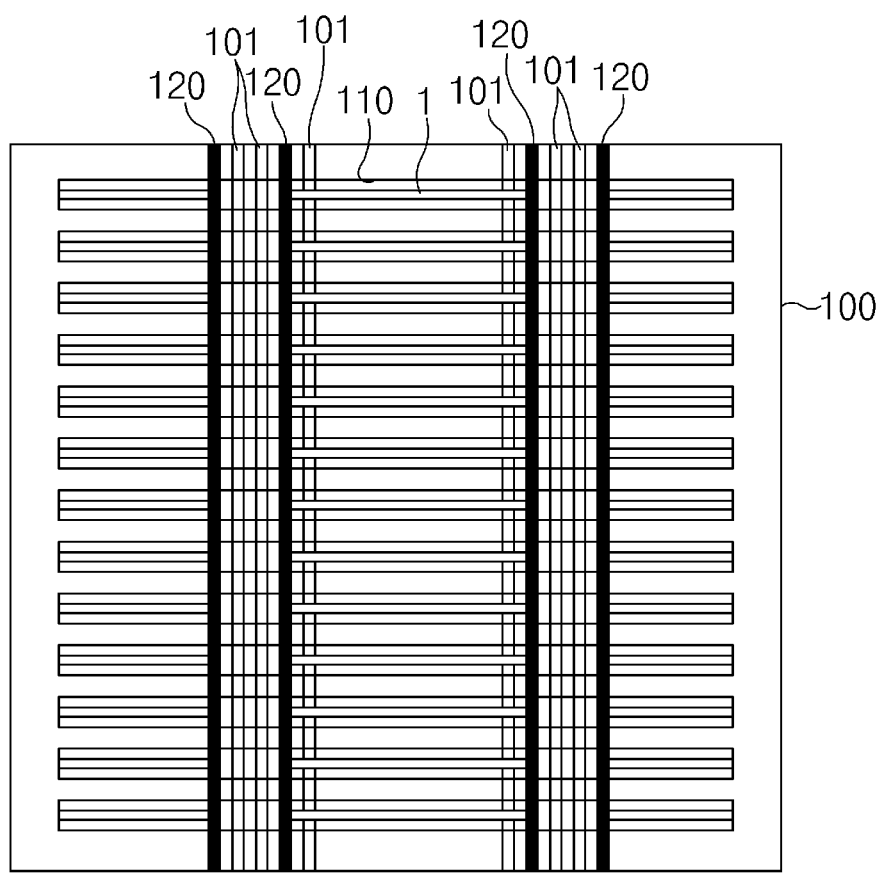
FIG. 4 is a schematic front view of a tray according to another embodiment of the present invention, with a blocking portion thereof installed thereon.
Figure 5:
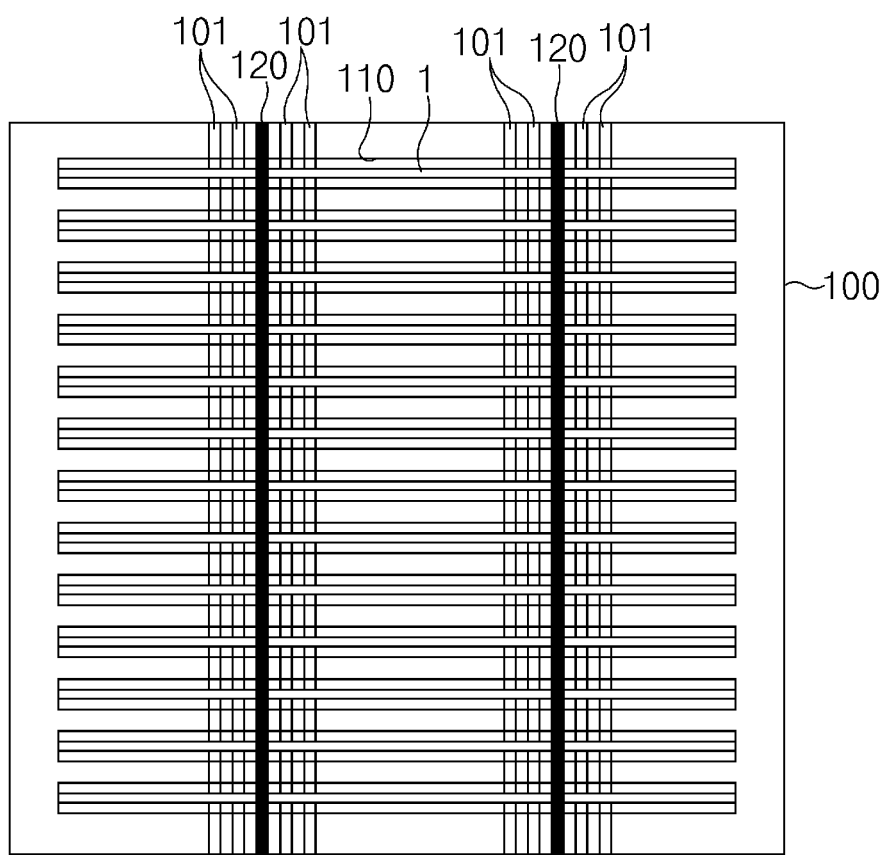
FIG. 5 is a schematic front view of a tray according to still another embodiment of the present invention, with a blocking portion thereof installed thereon.

FIG. 4 is a schematic front view of a tray according to another embodiment of the present invention, with a blocking portion thereof installed thereon, and FIG. 5 is a schematic front view of a tray according to still another embodiment of the present invention, with a blocking portion thereof installed thereon.

AS illustrated in FIG. 4 and FIG. 5, in each of trays according to embodiments of the present invention, the blocking portion may be coupled at a portion differing from that in the previous embodiment among a plurality of the fitting grooves 101 formed in the housing 100, so that the trays of these embodiments may receive the secondary batteries 1, the sizes of which differ from those in the tray of the previous embodiments.

Figure 6:
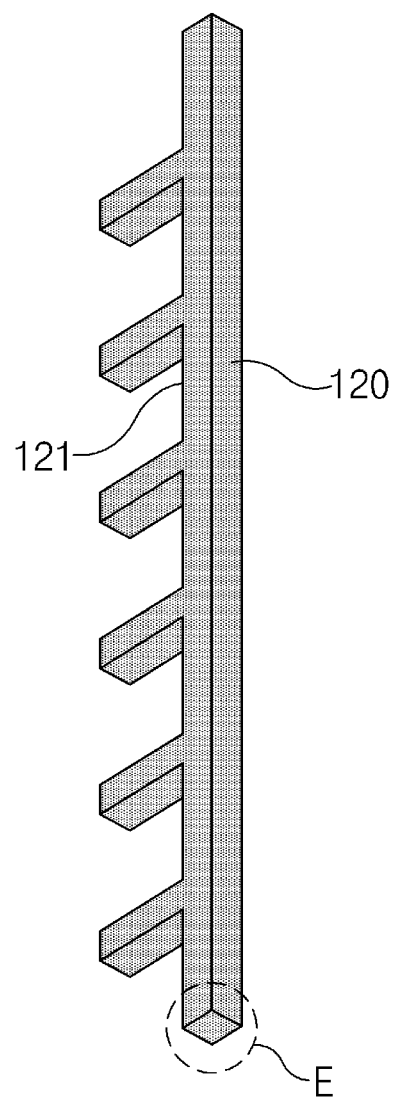
FIG. 6 is a perspective view illustrating a blocking portion of a tray, according to a further embodiment of the present invention.
Figure 7:
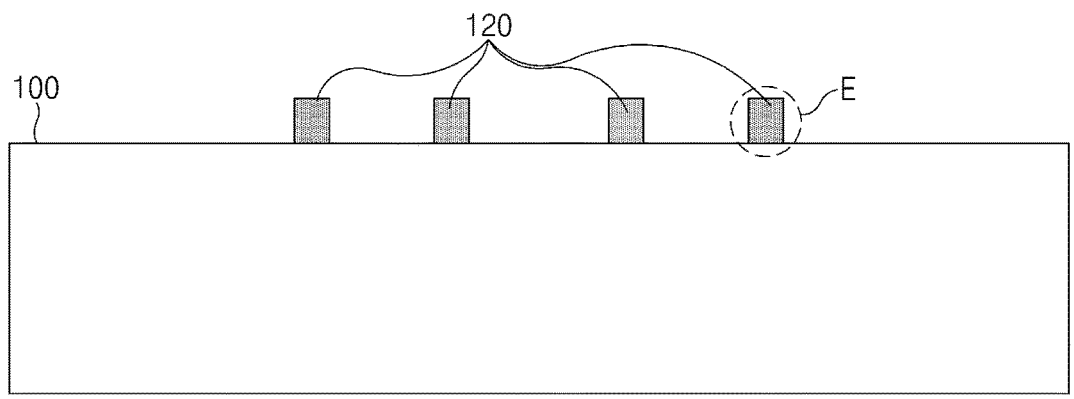
FIG. 7 is a bottom view of a tray on which the blocking portion of FIG. 6 is installed.
Figure 8:
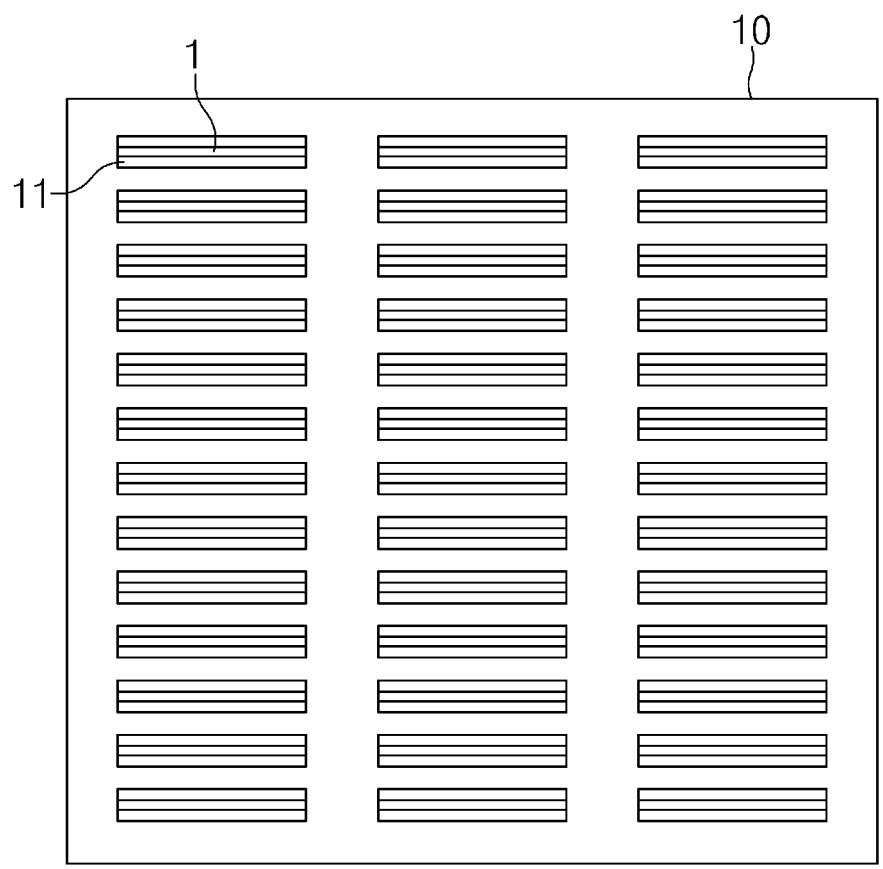
FIG. 8 is a front view illustrating a related art transfer tray.

FIG. 6 is a perspective view illustrating a blocking portion of a tray according to a further embodiment of the present invention, and FIG. 7 is a bottom view of a tray on which the blocking portion of FIG. 6 is installed.

As illustrated in FIG. 6 and FIG. 7, the tray according to a further embodiment of the present invention may have a concave fitting groove 121 in the blocking portion 120 instead of having the fitting groove 101 in the housing 100.

The fitting groove 121 may be provided in plurality at a one-side end portion of the blocking portion 120, thereby allowing the blocking portion 120 to be detachably coupled to the housing 100 while crossing the receiving portion 110.

In this way, when the blocking portion 120 is coupled to the housing 100, a lower-side end portion E of the blocking portion 120 may face toward the bottom surface of the housing 100.

The width of the fitting groove 121 may be identical to the distance between one receiving portion 110 and another receiving portion 110 neighboring to the one receiving portion 110.

As described above, according the present invention, a plurality of second batteries having different sizes may be received in one tray.

According to the present invention, a single tray may receive a plurality of secondary batteries having different sizes, so that costs of preparation of an additional tray for receiving secondary batteries having different sizes may eliminated or reduced, thereby providing cost-saving effect.

According to the present invention, the size of the receiving portion may be adjusted to correspond to the size of a secondary battery by detachably coupling a blocking portion to a housing, so that the operation may be simple and convenient.

According to the present invention, since the size of the receiving portion may be adjusted to correspond to the size of a secondary battery in such a manner that the blocking portion is detachably coupled the housing, secondary batteries having a relatively large difference size may be received in one tray.

As described above, the trays according to embodiments of the present invention have been described with reference to the illustrated drawings. However, the present invention is not limited by the above-described embodiments and drawings, and various implementations are possible within the scope of the claims by those skilled in the art to which the present invention belongs.

What is claimed is:

1. A tray to accommodate batteries having various sizes, the tray comprising:
   a housing;
   a plurality of receiving portions formed within the housing, each formed as a linear recess for receiving a secondary battery therein; and
   a blocking portion detachably coupled to the housing to cross the plurality of receiving portions for adjusting a size of each of the plurality of receiving portions,
   wherein the blocking portion is configured to divide each of the plurality of receiving portions into a plurality of divided sections and adjust widths of the divided sections, and
   wherein the blocking portion crosses all of the plurality of receiving portions.

2. The tray of claim 1, wherein the housing comprises a fitting groove concavely formed in the housing to cross the plurality of receiving portions, and the blocking portion is fitted into the fitting groove.

3. The tray of claim 2, wherein the fitting groove is provided in plurality.

4. The tray of claim 2, wherein the fitting groove is formed to cross the plurality of receiving portions in a direction perpendicular to a width direction (W) of the plurality of receiving portions.

5. The tray of claim 1, wherein the blocking portion comprises a fitting groove concavely formed to be fitted into the housing so as to cross the housing.

6. The tray of claim 1, wherein the blocking portion is coupled to the housing to cross the plurality of the receiving portions in a direction crossing the plurality of receiving portions.

7. The tray of claim 1, wherein the blocking portion is provided in plurality and detachably coupled to the housing.

8. The tray of claim 2, wherein the blocking portion is provided in plurality and detachably coupled to the housing.

9. The tray of claim 3, wherein the blocking portion is provided in plurality and detachably coupled to the housing.

10. The tray of claim 4, wherein the blocking portion is provided in plurality and detachably coupled to the housing.

11. The tray of claim 5, wherein the blocking portion is provided in plurality and detachably coupled to the housing.

12. The tray of claim 6, wherein the blocking portion is provided in plurality and detachably coupled to the housing.

* * * * *